United States Patent [19]

St. Clair

[11] Patent Number: 5,256,015
[45] Date of Patent: Oct. 26, 1993

[54] TORQUE LIMITING BOLT HAVING RETAINED SHEAR PINS

[75] Inventor: Kenneth A. St. Clair, Cincinnati, Ohio

[73] Assignee: The United States of America as represented by the Secretary of the Air Force, Washington, D.C.

[21] Appl. No.: 835,155

[22] Filed: Feb. 13, 1992

[51] Int. Cl.⁵ .............................................. F16B 31/00
[52] U.S. Cl. ............................................ 411/4; 411/8; 411/396; 411/916
[58] Field of Search ....................................... 411/1-4, 411/8, 14, 396, 398, 916

[56] References Cited

U.S. PATENT DOCUMENTS

| | | | |
|---|---|---|---|
| 1,380,395 | 6/1921 | Korach | 411/3 |
| 3,267,792 | 8/1966 | Yackle | 85/61 |
| 3,460,428 | 8/1969 | Charles | 411/2 |
| 4,144,796 | 3/1979 | Richter et al. | 85/61 |
| 4,167,886 | 9/1979 | Seghezzi et al. | 85/61 |
| 4,177,352 | 12/1979 | Dunbar et al. | 174/1 |
| 4,904,145 | 2/1990 | Koutsoupidis | 411/396 |
| 4,964,773 | 10/1990 | Schmidt | 411/396 X |

FOREIGN PATENT DOCUMENTS

| | | | |
|---|---|---|---|
| 2352400 | 6/1974 | Fed. Rep. of Germany | 411/2 |
| 2658996 | 6/1978 | Fed. Rep. of Germany | 411/4 |
| 201178 | 7/1983 | Fed. Rep. of Germany | 411/1 |

*Primary Examiner*—Renee S. Luebke
*Assistant Examiner*—Suzanne L. Dino
*Attorney, Agent, or Firm*—Donald J. Singer; Robert L. Nathans

[57] ABSTRACT

Torque limiting bolt employs a number pins which shear upon the application of a predetermined torque to the bolt head. The bolt configuration insures that sheared portions of the pins are held within the bolt head to prevent undesirable scattering of the pin portions on an airstrip. A removal hex head is thinner than a driving hex head positioned over the removal hex to discourage the application of a wrench directly to the removal head. The outermost portions of the hex heads are also angularly displaced from each other for this purpose.

20 Claims, 1 Drawing Sheet

TORQUE LIMITING BOLT HAVING RETAINED SHEAR PINS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of torque limiting bolts and more particularly those having shear pins.

The use of members which shear upon the application of a predetermined torque to a bolt is old in the art. As stated in U.S. Pat. No. 4,167,886 issued to Seghezzi et al., a preset torque can be applied by means of a torque wrench. However, such wrenches are sensitive to damage and are otherwise deemed undesirable. This patent teaches positioning three shear pins between a bolt head cap and the bolt head interior. When the torque applied to the cap becomes excessive, the pins break and the cap becomes separated from the bolt head. Other similar devices which fracture employ hex nuts which shear off at the predetermined torque, thereby to eliminate the need for torque wrenches. However, these designs create broken off foreign objects which may be ingested or propelled by aircraft on the flight line, creating a dangerous condition. Such foreign objects in many other environments are also undesirable as they can cause falls for example.

SUMMARY OF A PREFERRED EMBODIMENT OF THE INVENTION

It is the principal object of the present invention to provide a simple torque limiting bolt design which can minimize the aforesaid drawbacks of prior art approaches.

It is a further object of the invention to provide a torque limiting bolt requiring no tools other than an ordinary wrench, and which can be reused after the pins therein become sheared and new pins inserted.

The bolt employs a plurality of torque limiting shearing pins positioned within the bolt so that they cannot fall out of the bolt when sheared to produce the dangerous condition referred to above. A hex driving member is fastened to a hex removal portion of the bolt body whereby the outermost portions of the hexes are angularly offset with respect to each other to make it difficult to apply a wrench to the lower removal hex to thus bypass the shearing of the shearing pins. Also, in aid of this goal, the height of the lower hex is made substantially less than the height of the driving hex to further deter the application of a wrench to the lower hex.

BRIEF DESCRIPTION OF THE DRAWINGS

Other objects, features and advantages of the invention will become apparent upon study of the following description taken in conjunction with the drawings in which.

DETAILED DESCRIPTION OF THE PREFERRED EMBODIMENT

Figure 1:
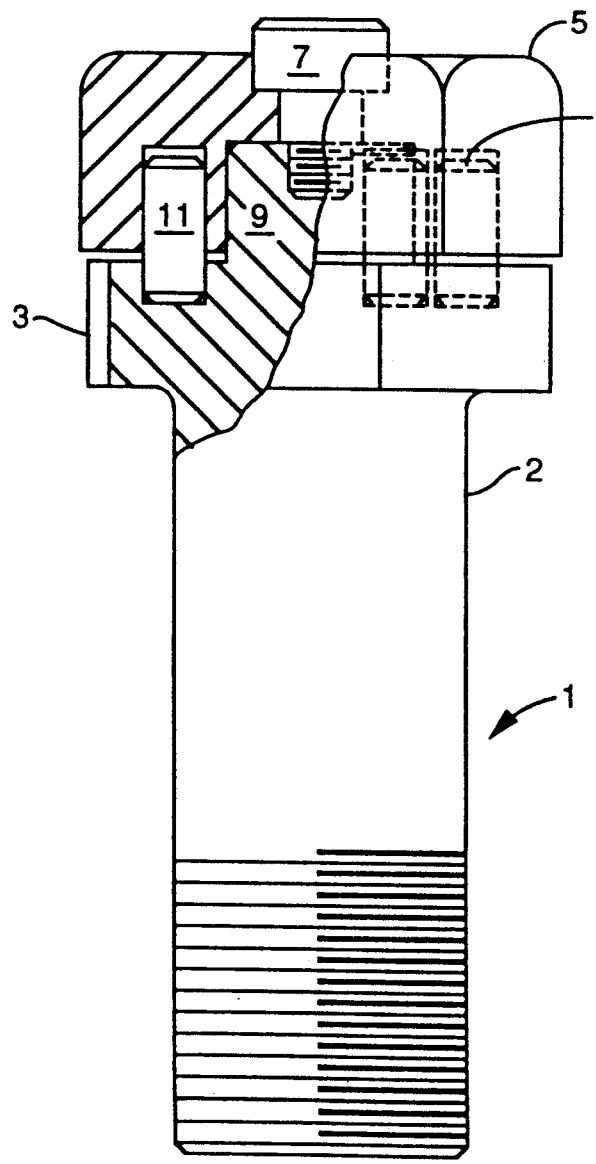
FIG. 1 illustrates a partial sectional front view of a preferred embodiment of the invention.

As shown in FIG. 1, an upper portion 2 of the bolt body 1 has a hex removal portion 3 integral with the bolt body for enabling removal of a previously installed bolt. A hexagonal driving member 5 is coupled to the uppermost portion of the bolt body 9 by a retaining member such as retaining screw 7. Application of torque by an ordinary wrench to hex driving member 5 causes the six shear pins 11 to act as keys to drive the removal hex 3 and hence bolt body 2 until a predetermined torque is reached at which time the pins shear to prevent further torque to be applied to the lower hex 3 and the bolt body. Note that the now sheared pin portions are captured within the hex members so that they cannot escape from the bolt to create the aforesaid dangerous condition. In other words, since the shearing pins are freely positioned within members 3 and 5 they could escape, in the absence of having the terminal pin portions captured therein as shown in FIG. 1. Also, as the pins are not affixed to the bolt members, they may be rapidly replaced by new pins as mentioned previously, rendering the bolt reusable.

Figure 2:
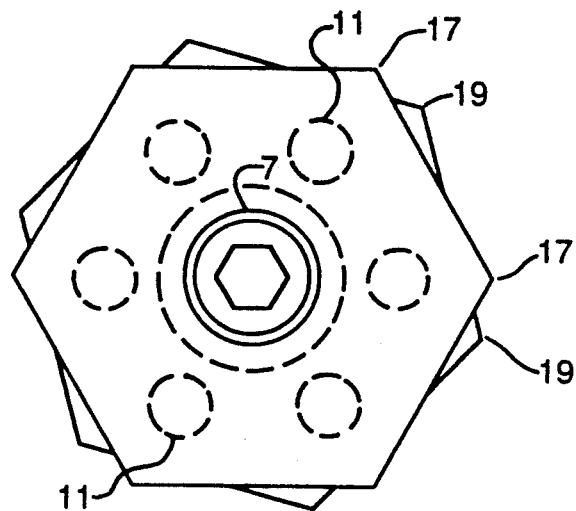
FIG. 2 illustrates a top view of FIG. 1.

The aforesaid misapplication of the ordinary wrench to the lower hex head 3 is deterred by the angular offsetting of the outermost portions of the hexes 17 and 19 shown in FIG. 2. This offsetting is produced by relative manual rotation of the hexes before the final tightening of the retaining screw 7. Note also the short height of the removal hex 3 which further deters the misapplication of the wrench to the lower removal hex which is to be used only for removal of the bolt at a subsequent time.

This design can be used strictly as an over-torque protection device such that shearing would only occur in the event of an over-torque, or to insure that proper torque had been applied by intentionally shearing the pins upon the application of such proper torque. The torque limit for a particular bolt is set by varying any or all of the following: shear pin diameter or length, or the number of pins, or the radial pin distance from the bolt shank centerline or the material properties of the pins.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A torque limiting bolt which is reusable comprising:
   - (a) a bolt body having a bolt removal means at an upper portion thereof for enabling removal of the torque limiting bolt after installation;
   - (b) a driving member coupled to the upper portion of said bolt body by a removable retaining means;
   - (c) at least one shearing member capable of being sheared upon the application of a predetermined shearing force applied thereto, said shearing member being freely positioned within both the upper portion of said bolt body and said driving member to enable subsequent removal therefrom, said shearing member having a first terminal portion completely enclosed within said driving member and having a second terminal portion, opposite said first terminal portion, said second terminal portion being completely enclosed within said bolt removal means, thereby to prevent sheared parts of the shearing member from escaping from the torque limiting bolt as long as the removable retaining means retains the driving member against the upper portion of the bolt body.

2. The torque limiting bolt of claim 1 wherein the outermost portions of the bolt removal means of the bolt body are angularly displaced with respect to the outermost portions of the driving member to an extend to make it difficult to apply a wrench to the removal means of the bolt body during installation of said torque limiting bolt.

3. The torque limiting bolt of claim 1 wherein the height of the removal means of the bolt body is substantially less than the height of the driving member, thereby to deter the application of a wrench to the removal means of the bolt body upon installation of the torque limiting bolt.

4. The torque limiting bolt of claim 2 wherein the height of the removal means of the bolt body is substantially less than the height of the driving member, thereby to further deter the application of a wrench to the removal means of the bolt body upon installation of the torque limiting bolt.

5. The torque limiting bolt of claim 1 wherein said shearing member comprises a shear pin extending between the driving member and the upper portion of said bolt body.

6. The torque limiting bolt of claim 2 wherein said shearing member comprises a shear pin extending between the driving member and the upper portion of said bolt body.

7. The torque limiting bolt of claim 3 wherein said shearing member comprises a shear pin extending between the driving member and the upper portion of said bolt body.

8. The torque limiting bolt of claim 4 wherein said shearing member comprises a shear pin extending between the driving member and the upper portion of said bolt body.

9. A torque limiting bolt which is reusable comprising:
   (a) a bolt body having a hexagonal removal portion at an upper portion thereof for enabling removal of the torque limiting bolt after installation;
   (b) a hexagonal driving member coupled to the upper portion of said bolt body by a removable retaining member;
   (c) at least one shearing member capable of being sheared upon the application of a predetermined shearing force applied thereto, said shearing member being freely positioned within both the upper portion of said bolt body and said hexagonal driving member to enable subsequent removal therefrom, said shearing member having a first terminal portion completely enclosed within said hexagonal driving member and having a second terminal portion, opposite said first terminal portion, said second terminal portion being completely enclosed within said hexagonal removal portion, thereby to prevent sheared parts of the shearing member from escaping from the torque limiting bolt as long as the removable retaining member retains the hexagonal driving member against the upper portion of the bolt body.

10. The torque limiting bolt of claim 9 wherein the outermost portions of the hexagonal removal portion of the bolt body are angularly displaced with respect to the outermost portions of the hexagonal driving member to an extent to make it difficult to apply a wrench to the hexagonal removal portion of the bolt body during installation of said torque limiting bolt.

11. The torque limiting bolt of claim 9 wherein the height of the hexagonal removal portion of the bolt body is substantially less than the height of the hexagonal driving member, thereby to deter the application of a wrench to the hexagonal removal portion of the bolt body upon installation of the torque limiting bolt.

12. The torque limiting bolt of claim 10 wherein the height of the hexagonal removal portion of the bolt body is substantially less than the height of the hexagonal driving member, thereby to further deter the application of a wrench to the hexagonal removal portion of the bolt body upon installation of the torque limiting bolt.

13. The torque limiting bolt of claim 9 wherein said shearing member comprises a shear pin extending between the hexagonal driving member and the upper portion of said bolt body.

14. The torque limiting bolt of claim 10 wherein said shearing member comprises a shear pin extending between the hexagonal driving member and the upper portion of said bolt body.

15. The torque limiting bolt of claim 11 wherein said shearing member comprises a shear pin extending between the hexagonal driving member and the upper portion of said bolt body.

16. The torque limiting bolt of claim 12 wherein said shearing member comprises a shear pin extending between the hexagonal driving member and the upper portion of said bolt body.

17. A torque limiting bolt which is reusable comprising:
   (a) a bolt body having a hexagonal removal portion at an upper portion thereof for enabling removal of the torque limiting bolt after installation;
   (b) a hexagonal driving member coupled to the upper portion of said bolt body by a removable retaining screw;
   (c) a plurality of parallel shear pins capable of being sheared upon the application of a predetermined shearing force applied thereto, said shearing pins being freely positioned within both the upper portion of said bolt body and said hexagonal driving member to enable subsequent removal therefrom, said shearing pins having first terminal portions completely enclosed within said hexagonal driving member and having second terminal portions, opposite said first terminal portions, said second terminal portions being completely enclosed within said hexagonal removal portion, thereby to prevent sheared parts of the shearing pins from escaping from the torque limiting bolt as long as the removable retaining screw retains the hexagonal driving member against the upper portion of the bolt body.

18. The torque limiting bolt of claim 17 wherein the outermost portions of the hexagonal removal portion of the bolt body are angularly displaced with respect to the outermost portions of the hexagonal driving member to an extent to make it difficult to apply a wrench to the hexagonal removal portion of the bolt body to rotate the hexagonal removal portion during installation of said torque limiting bolt.

19. The torque limiting bolt of claim 17 wherein the height of the hexagonal removal portion of the bolt body is substantially less than the height of the hexagonal driving member, thereby to deter the application of a wrench to the hexagonal removal portion of the bolt body upon installation of the torque limiting bolt.

20. The torque limiting bolt of claim 18 wherein the height of the hexagonal removal portion of the bolt body is substantially less than the height of the hexagonal driving member, thereby to deter the application of a wrench to the hexagonal removal portion of the bolt body upon installation of the torque limiting bolt.

* * * * *